United States Patent
Leines

(10) Patent No.: US 11,952,063 B2
(45) Date of Patent: *Apr. 9, 2024

(54) TRAILER HAVING RETRACTABLE AXLES

(71) Applicant: CW10K40 LLC, Camden, DE (US)

(72) Inventor: Torsten Leines, Maple Grove, MN (US)

(73) Assignee: CW10K40 LLC, Camden, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,438

(22) Filed: Aug. 26, 2022

(65) Prior Publication Data

US 2022/0410993 A1 Dec. 29, 2022

Related U.S. Application Data

(63) Continuation of application No. 16/263,513, filed on Jan. 31, 2019, now Pat. No. 11,447,197.

(51) Int. Cl.
| | | |
|---|---|---|
| *B62D 63/06* | (2006.01) | |
| *B60P 1/02* | (2006.01) | |
| *B60P 3/40* | (2006.01) | |
| *B62D 21/20* | (2006.01) | |
| *E21B 19/14* | (2006.01) | |

(52) U.S. Cl.
CPC ............ *B62D 63/061* (2013.01); *B60P 1/027* (2013.01); *B60P 3/40* (2013.01); *B62D 21/20* (2013.01); *E21B 19/14* (2013.01)

(58) Field of Classification Search
CPC ....... B62D 63/061; B62D 21/20; B60P 1/027; B60P 3/40; E21B 19/14
See application file for complete search history.

(56) References Cited

U.S. PATENT DOCUMENTS

| | | | | |
|---|---|---|---|---|
| 4,934,733 A | * | 6/1990 | Smith | B60G 3/207 280/124.132 |
| 5,275,430 A | * | 1/1994 | Smith | B60G 11/465 280/124.132 |
| 7,281,728 B1 | * | 10/2007 | Wayrynen | B60P 3/1066 280/414.1 |
| 7,537,219 B1 | * | 5/2009 | Sherwood | B60G 3/14 280/6.151 |
| 8,727,360 B2 | | 5/2014 | Catford | |
| 10,232,758 B1 | | 3/2019 | Davis | |
| 11,021,199 B2 | * | 6/2021 | Linkletter | B62D 63/08 |

(Continued)

*Primary Examiner* — Jacob D Knutson
*Assistant Examiner* — Marlon A Arce
(74) *Attorney, Agent, or Firm* — Dicke, Billig & Czaja, PLLC

(57) ABSTRACT

Aspects of the disclosure relate to a trailer having a frame suitable for transporting an item, such as an oil drilling pipe. The trailer includes a plurality of stabilizers for supporting the frame over a surface, at least one axle attached to a plurality of wheels. The trailer further includes an axle pin group includes first and second axle pins interconnected to respective hydraulic cylinders. The trailer further includes leaf springs connected to respective sides of the frame and mounted to the axle. Retraction of the axle pins away from the leaf springs enables movement of the frame with respect to the axle due to the weight of the frame, if the stabilizers are retracted. In this configuration, the frame can be raised and lowered with respect to the surface. Methods of use are also disclosed.

19 Claims, 13 Drawing Sheets

(56) References Cited

U.S. PATENT DOCUMENTS

| | | |
|---|---|---|
| 2002/0084123 A1 | 7/2002 | Farsdale |
| 2008/0000660 A1 | 1/2008 | Moe |
| 2010/0289250 A1 | 11/2010 | Fankhauser et al. |
| 2012/0298935 A1 | 11/2012 | Ross |
| 2018/0015864 A1 | 1/2018 | Heck |
| 2018/0215302 A1 | 8/2018 | Reid |
| 2020/0247490 A1 | 8/2020 | Leines |

* cited by examiner

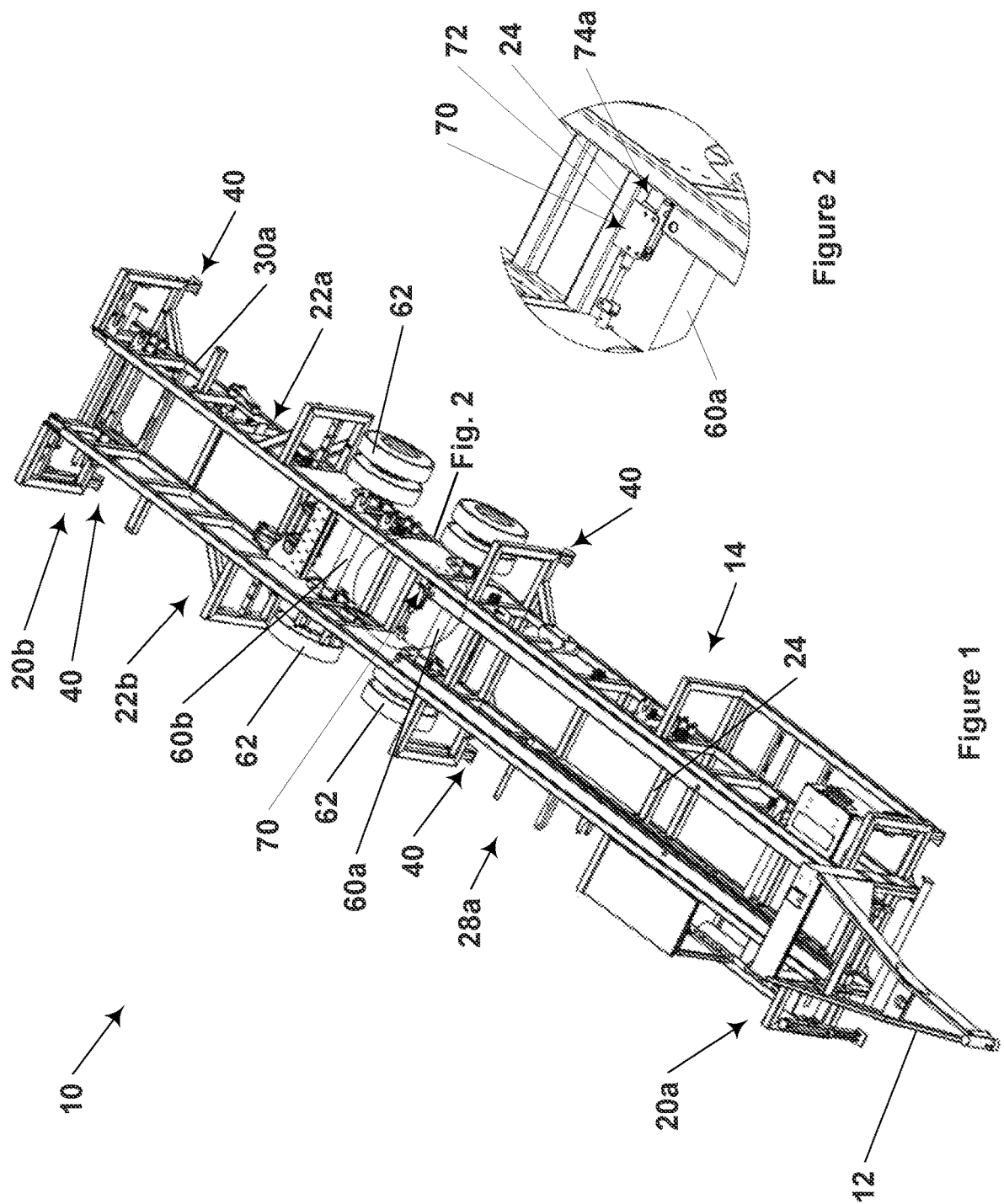

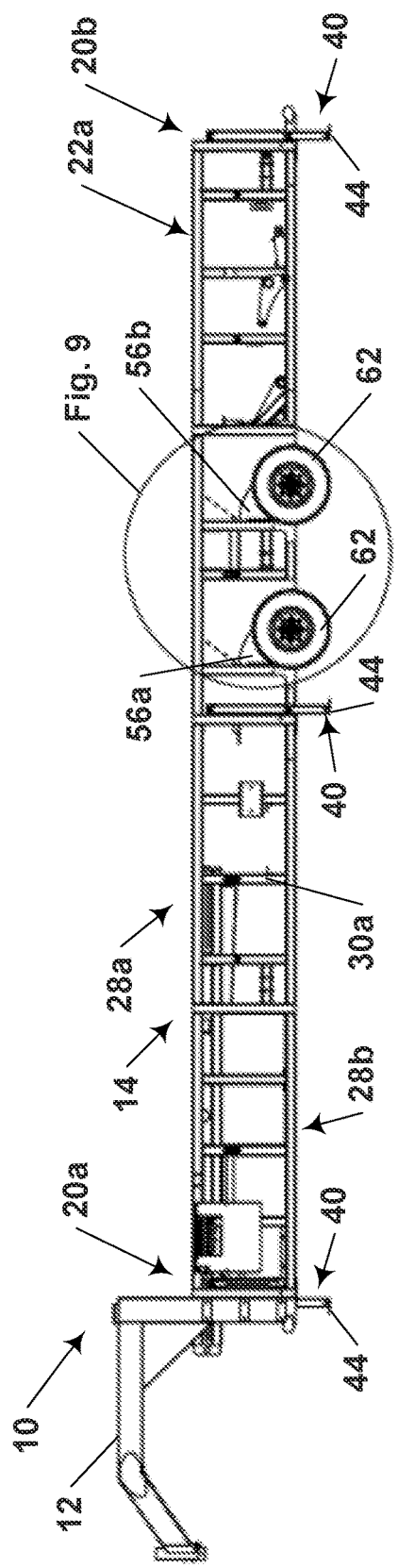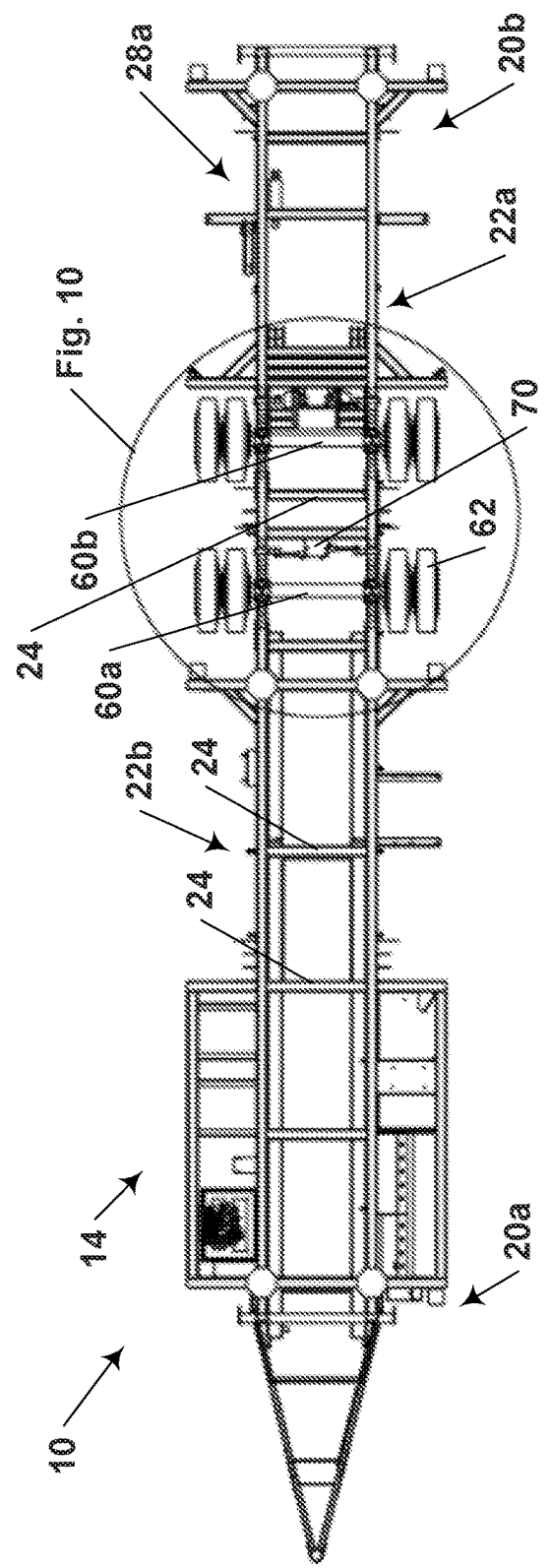

TRAILER HAVING RETRACTABLE AXLES

CROSS-REFERENCE TO RELATED APPLICATIONS

This application is a continuation of U.S. application Ser. No. 16/263,513, filed Jan. 31, 2019, now allowed, entitled "TRAILER HAVING RETRACTABLE AXLES" the entire teachings of which are incorporated herein by reference.

BACKGROUND

Drilling rigs are known and used for identifying geologic reservoirs of natural resources, such as oil, for example, and also to create holes that allow the extraction of natural resources from those reservoirs. The extraction process begins by positioning the drilling rig over the site to be drilled. Drilling rigs can be mobile and driven from site to site or can also be more permanent structures positioned over the drilling site.

The process begins by drilling a hole deep into the Earth. A long drill bit attached to a section of "drilling string" is used for this purpose. After each section is drilled, a steel pipe slightly smaller than the hole diameter is dropped in and often cement is used to fill the outer gap. The steel pipe is called a casing and provides structural integrity to the drilled hole. As the drill bit progresses deeper, additional sections of pipe need to be added to the drilling string to allow the drill bit to move further into the Earth. Typically, workers standing on the drilling rig take the additional sections of pipe, one by one, and screw them onto the drilling string, as needed. The additional sections of pipe are delivered to the site and then raised one by one to the workers with a crane. Currently, pipe sections are transported to the work site on a mobile truss trailer.

The present disclosure addresses problems and limitations with the related art.

SUMMARY

Aspects of the disclosure relate to a trailer having a frame for supporting and transporting a section of pipe or other item. The trailer includes wheels supported on axles, the axles being rotatably retractable within the frame to allow the frame to move vertically and horizontally with respect to a surface (typically the ground) on which the wheels are positioned. Embodiments of the disclosure are particularly useful for transporting pipe sections used in oil drilling. In such embodiments, the frame can be driven toward a job site, and then lowered to rest on the surface, making the trailer more stable (as compared to when the frame is elevated above the wheels) during removal of the pipe sections or other items from the trailer. Embodiments of the disclosure provide a safe and stable, yet mobile trailer.

In one aspect, the disclosure provides a trailer comprising a frame having opposing first and second sides as well as an axle supporting a plurality of wheels. The trailer also includes a first leaf spring connected to the frame. The axle is rotatably mounted to the first leaf spring. A second leaf spring is connected to the frame, and the axle is also rotatably mounted to the second leaf spring. The trailer further includes an axle pin group including a bracket secured to the frame as well as first and second hydraulic cylinders connected to the bracket. The axle pin group further includes a first axle pin interconnected to the first hydraulic cylinder (the first hydraulic cylinder controlling movement of the first axle pin) and a second axle pin interconnected to the second hydraulic cylinder (the second hydraulic cylinder controlling movement of the second axle pin). The first and second axle pins are configured and arranged to selectively restrict vertical movement of the frame. Movement or retraction of the first axle pin and the second axle pin collectively allow for vertical movement of the frame with respect to the axle.

In another aspect, the disclosure provides a method of operating a trailer including providing a trailer in a transport arrangement, the trailer having a frame with first side and second sides as well as an axle supporting a plurality of wheels. In addition, the trailer includes a first biasing member connected to the frame and rotatably mounted to the axle, and a second biasing member connected to the frame and rotatably mounted to the axle. The trailer also includes an axle pin group having a first axle pin and a second axle pin. In the transport arrangement, the frame is elevated above the plurality of wheels and the first and second axle pins restrict vertical movement of the frame with respect to the axle. The method further includes retracting the first and second axle pins so that the frame moves horizontally and vertically with respect to the axle. In this way, the axles are retracted within the frame so that the frame can be lowered to contact a surface on which the trailer is positioned.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

FIG. 1 is a perspective view of a trailer of the disclosure.

FIG. 2 is an enlarged view of SEC. 2 of FIG. 1 illustrating an axle pin group of the trailer.

FIG. 7 is a side view of the trailer of FIGS. 1-3 in an intermediate arrangement.

FIG. 8 is a bottom view of the trailer of FIG. 7 in the intermediate arrangement.

DETAILED DESCRIPTION

Figure 3:
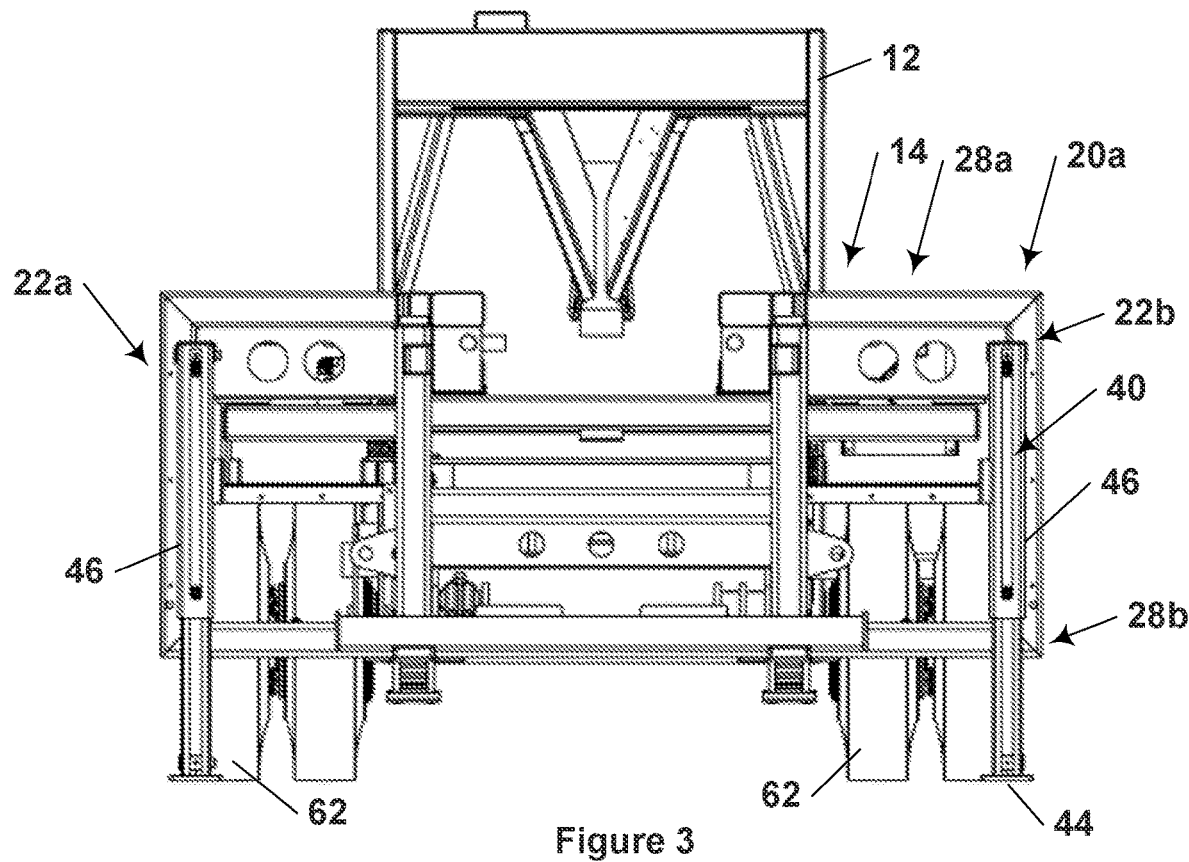
FIG. 3 is a rear end view of the trailer of FIGS. 1-2.
Figure 4:
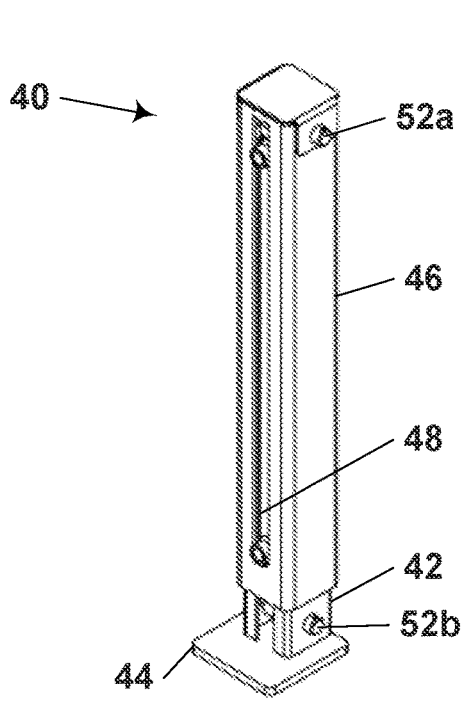
FIG. 4 is a perspective view of one representative stabilizer the trailer of FIGS. 1-3.
Figure 5:
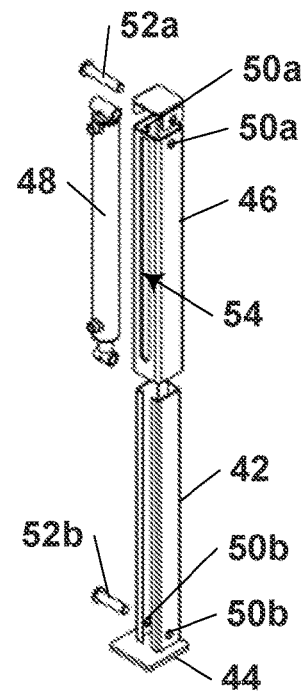
FIG. 5 is an exploded view of the stabilizer of FIG. 4.

In the following detailed description, reference is made to the accompanying drawings, which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

One illustrative trailer 10 is collectively illustrated in FIGS. 1-31. The trailer 10 includes a hitch 12 for securing to a vehicle (not shown), such as a truck, as well as a frame 14 interconnected to the hitch 12. The frame 14 can take a variety of forms, as desired, and supports an item to be transported. In one example, the item to be transported is a pipe section suitable for oil drilling. Therefore, the frame 14, in such embodiments is at least 40 feet in length and can support a weight of at least 60,000 lbs. The frame 14 can, for example, include first and second ends 20a, 20b, first and second sides 22a, 22b, and multiple bottom supports 24 spanning the first and second sides 22a, 22b. Each side 22a, 22b can include a top 26a, 26b and a bottom 28a, 28b and include multiple vertical supports 30a, 30b spanning the respective top 26a, 26b and bottom 28a, 28b. It is noted that only a few representative horizontal supports 24 and vertical supports 30a, 30b are referenced for ease of illustration. The present disclosure, however, is not intended to be limited to any particular frame 14 configuration.

The trailer 10 further includes a plurality of downriggers or stabilizers 40. In the illustrated embodiment, two stabilizers 40 are provided at each end 20a, 20b of the frame 14, one on each side 22a, 22b (four total). Additional stabilizers 40 can be provided, along the sides 22a, 22b of the frame 14, as desired. Stabilizers 40 are provided in pairs to prevent the frame 14 from flexing in undesirable ways. Stabilizers 40 can be arranged such that each corner of the frame 14 is individually controlled, whereas the center stabilizers 40 are jointly controlled. Each stabilizer 40 can include a post 42 and a stabilizer pad 44. As can be most easily seen in FIGS. 3-5, a housing 46 for each stabilizer 40 is secured to the frame 14 via welding, adding a plate and bolting them on, or the like. Each housing 46 houses a hydraulic cylinder 48 and one stabilizer 40 is positioned within each housing 46 in a telescoping manner driven by hydraulic cylinder 48. Specifically, the housing 46 and post 42 of each stabilizer 40 each include two apertures 50a, 50b through which a bolt 52a, 52b can be extended to interconnect the stabilizer 40 to one hydraulic cylinder 48. Thus, hydraulic cylinder 48 is configured to actuate reciprocal movement of the respective stabilizer 40 in and out of the housing 46 (i.e. between a retracted position and an extended position, respectively). In one embodiment, the housing 46 includes an opening 54 through which hydraulic tubing can pass to the hydraulic cylinder 48.

Figure 6A:
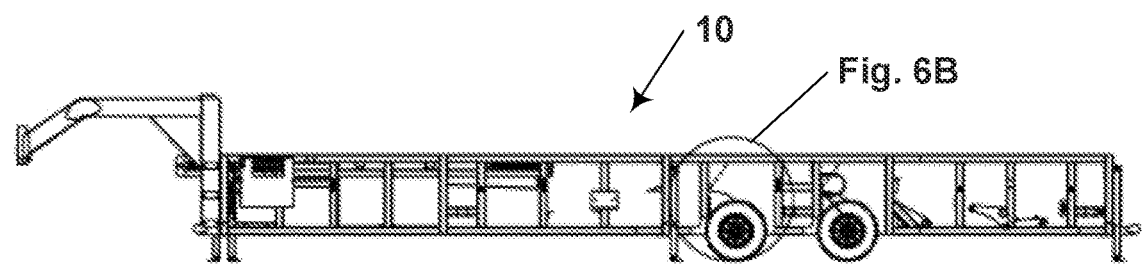
FIG. 6A is a side view of the trailer of FIGS. 1-3.
Figure 6B:
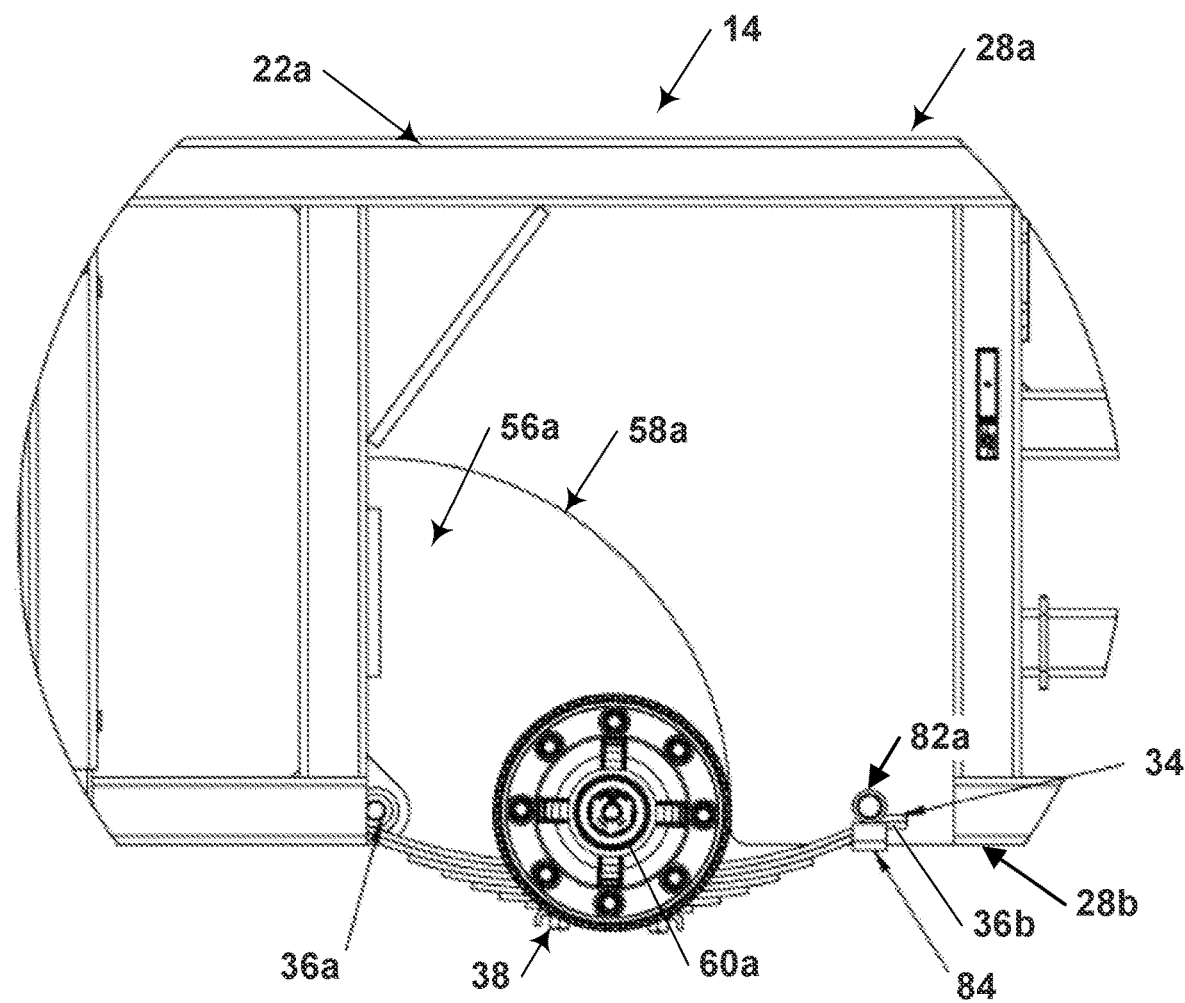
FIG. 6B is a partial, enlarged view of FIG. 6A illustrating a leaf spring supporting an axle.
Figure 9:
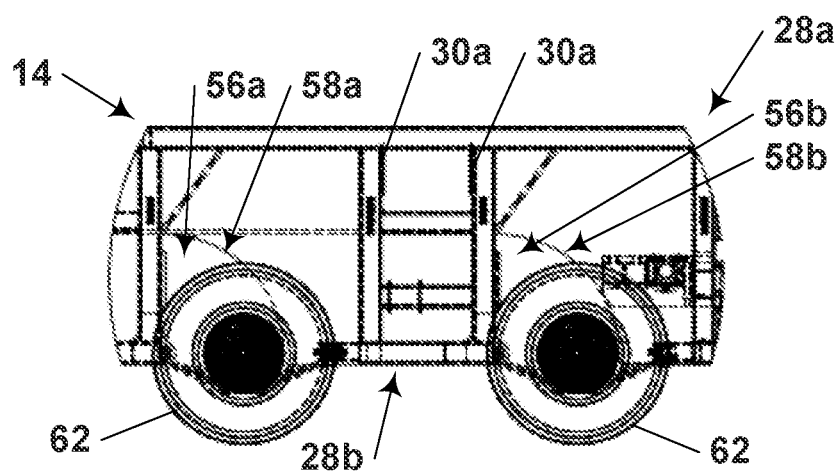
FIG. 9 is an enlarged, side view of SEC. 9 of FIG. 7 in the intermediate arrangement.
Figure 10:
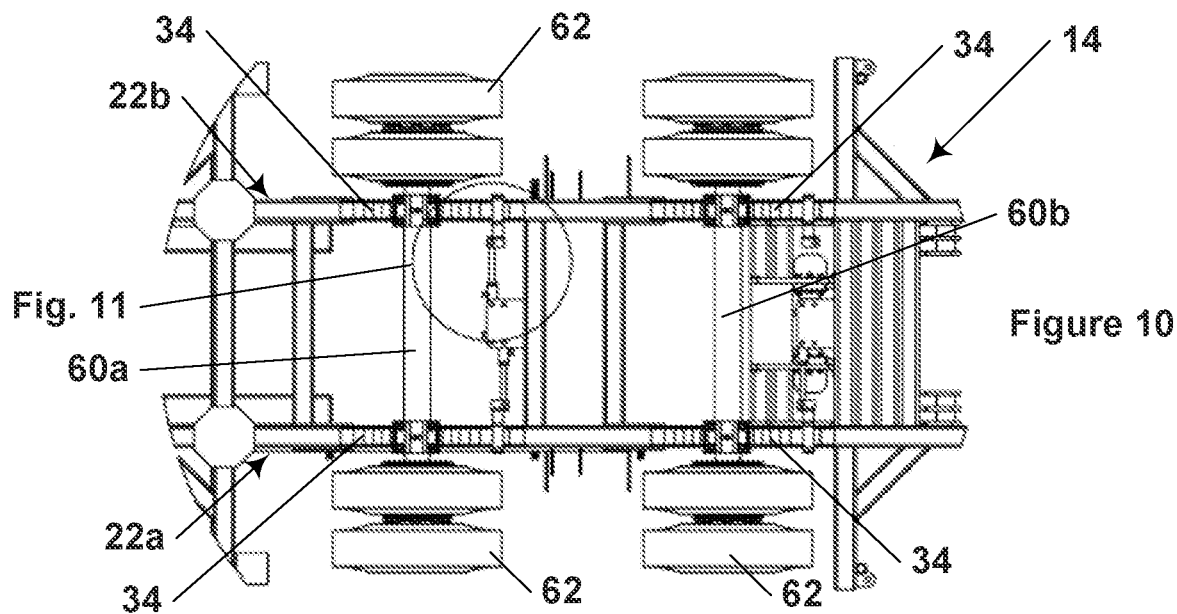
FIG. 10 is an enlarged, bottom view of SEC. 10 of FIG. 8.
Figure 11:
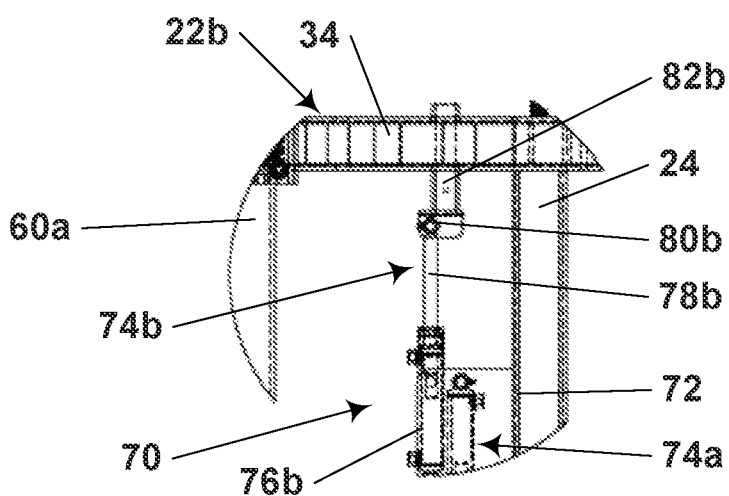
FIG. 11 is an enlarged, bottom view of SEC. 11 of FIG. 10.
Figure 12:
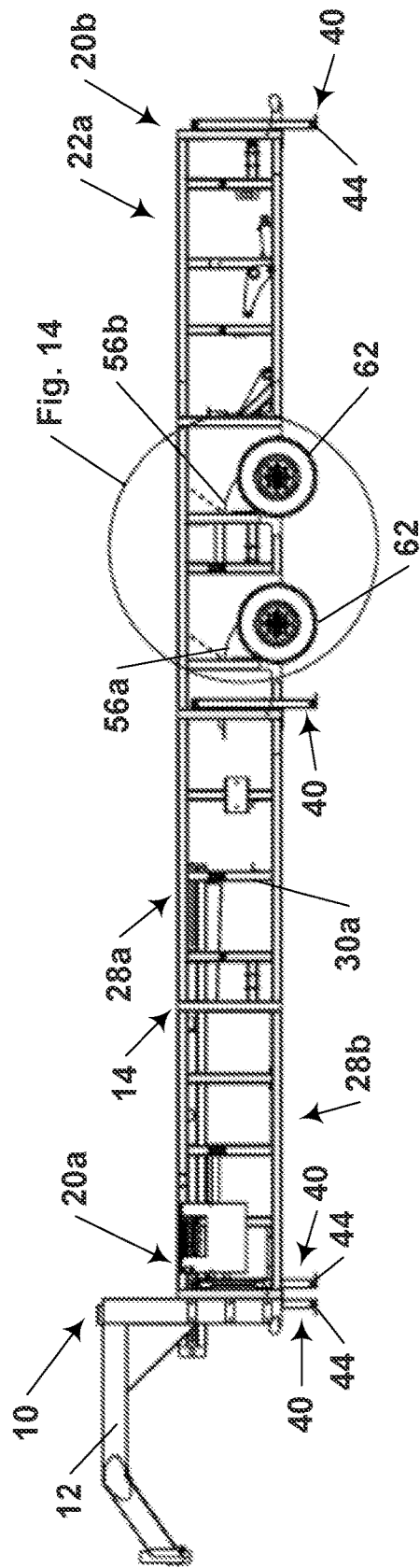
FIG. 12 is a side view of the trailer of FIGS. 1-2 in a first setup stage.
Figure 13:
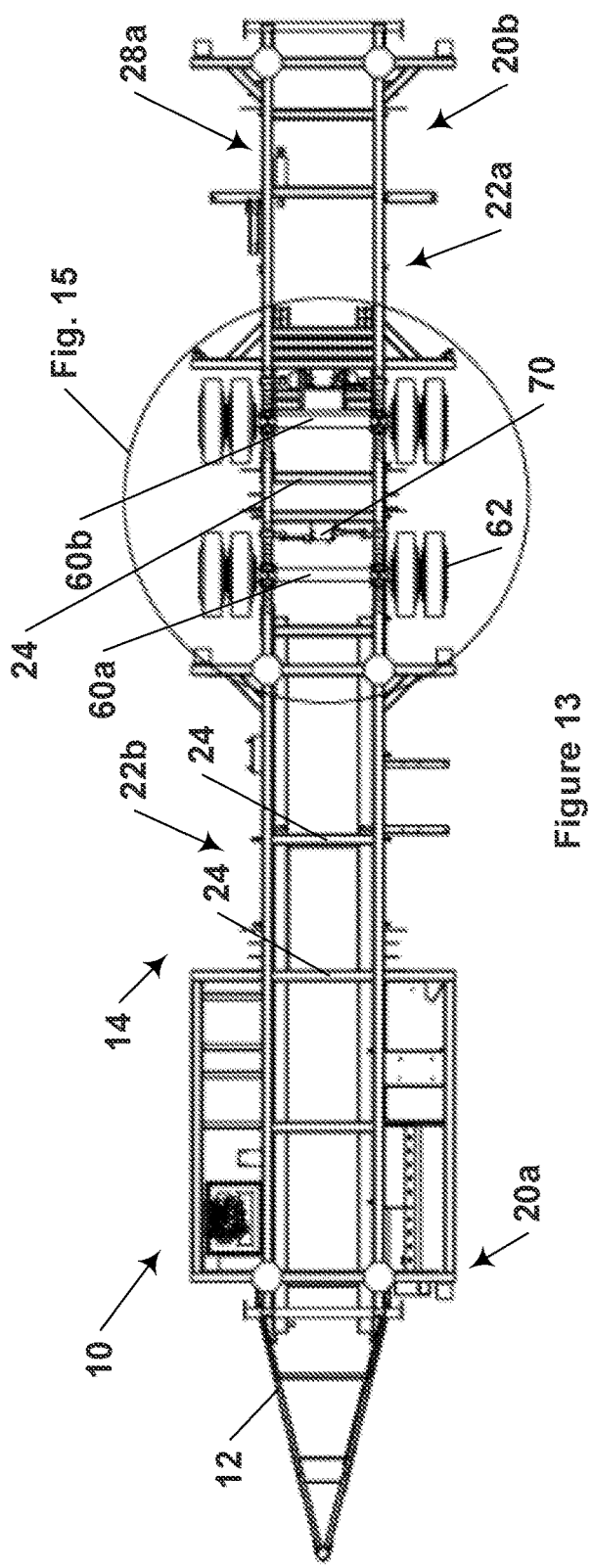
FIG. 13 is a bottom view of the trailer of FIG. 12 in the first setup stage.
Figure 14:
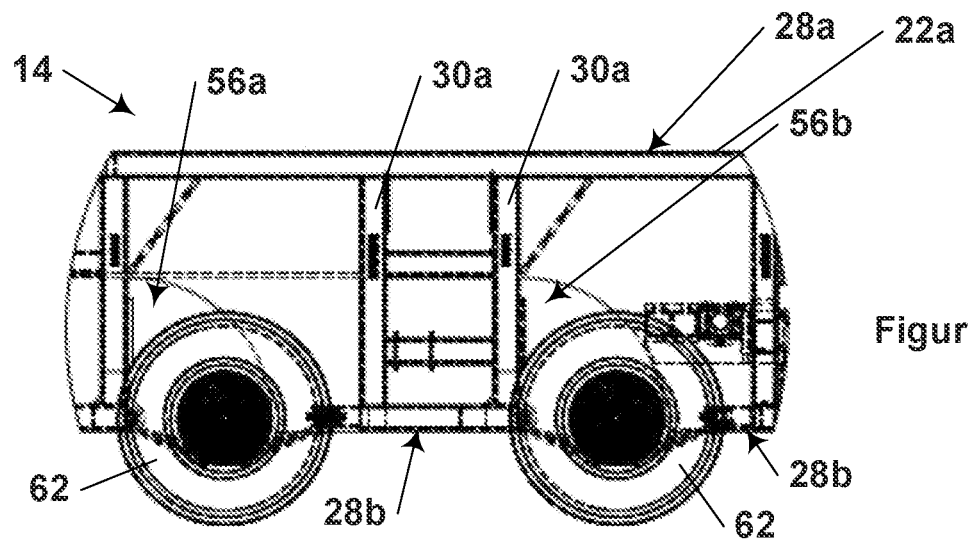
FIG. 14 is an enlarged, side view of SEC. 14 of FIG. 12.

Interconnected to the frame 14 is at least one axle 60a, 60b operatively supporting at least one wheel 62 on opposing sides 22a, 22b of the frame 14. The wheels 62 can be any type commonly used for trailers, trucks or the like. In the illustrated embodiment, the trailer 10 includes first and second axles 60a, 60b, each axle 60a, 60b supporting two wheels 62 on opposite sides 22a, 22b of the frame 14. As is perhaps best seen in FIGS. 6A-6B, the frame 14 further provides recesses 56a, 56b within which a corresponding axle 60a, 60b may retract, such as when the frame 14 travels relative to the axle 60a, 60b as will be discussed in greater detail below. It is noted that not all recesses are referenced but that recesses on side 22b of the frame 14 can be identically configured as recesses 56a, 56b. As can be seen, for example, in FIGS. 6-7 each recess 56a-d (one on each side 22a, 22b of the frame 14 for each axle 60a, 60b) is defined by an arced boundary 58a, 58b (FIG. 9), which can correspond to a path of movement of one free end of the axle 60a, 60b with respect to the frame 14. For each axle 60a, 60b, a leaf spring 34 is connected to the frame 14 at point 36a as is best seen in FIG. 6B with respect to the representative leaf spring 34. The leaf spring 34 rests proximate point 36b, between the bottom of pin 82a and support block 84. Each leaf spring 34 acts as a suspension for the respective axle 60a, which is rotatably mounted thereto with a mounting assembly 38a. Although only one leaf spring 34 and mounting assembly 38 is referenced on one side of the frame 14 with respect to one axle 60a, it will be understood that the second leaf spring 34 on the opposite side 22b of the frame 14 is identically configured. It will be further understood that one leaf spring 34 and mounting assembly 38 can be provided as shown in FIG. 6B in a similar manner on each side 22a, 22b of the frame 14 for each axle (e.g., 60a, 60b, etc.) provided.

Figure 20:
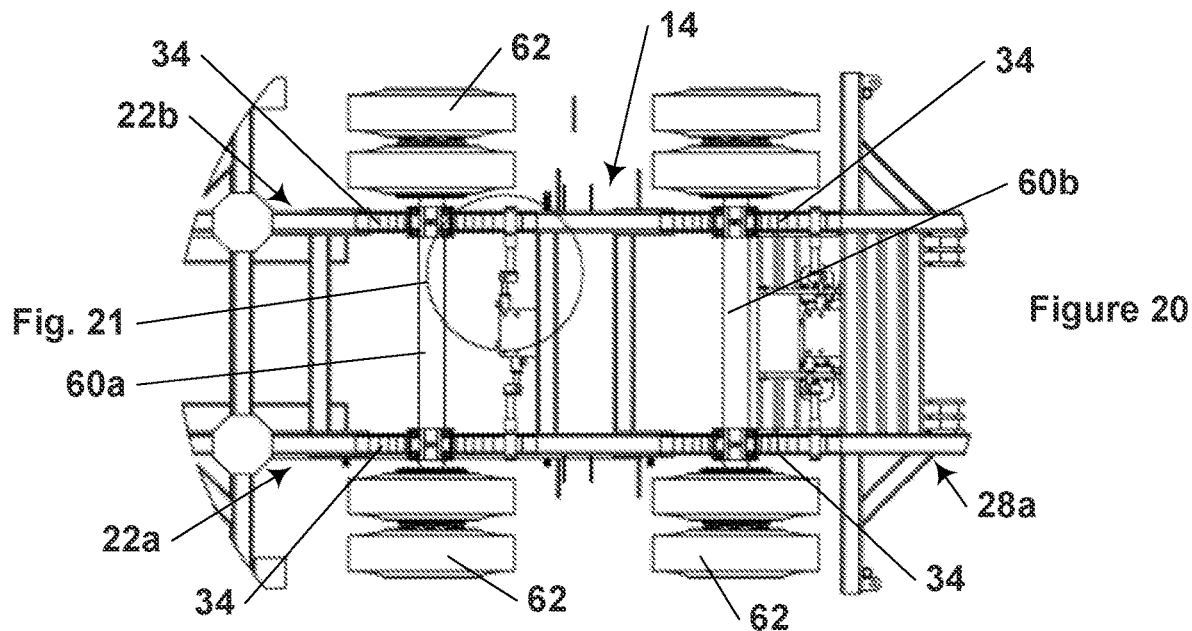
FIG. 20 is an enlarged, bottom view of SEC. 20 of FIG. 18.
Figure 21:
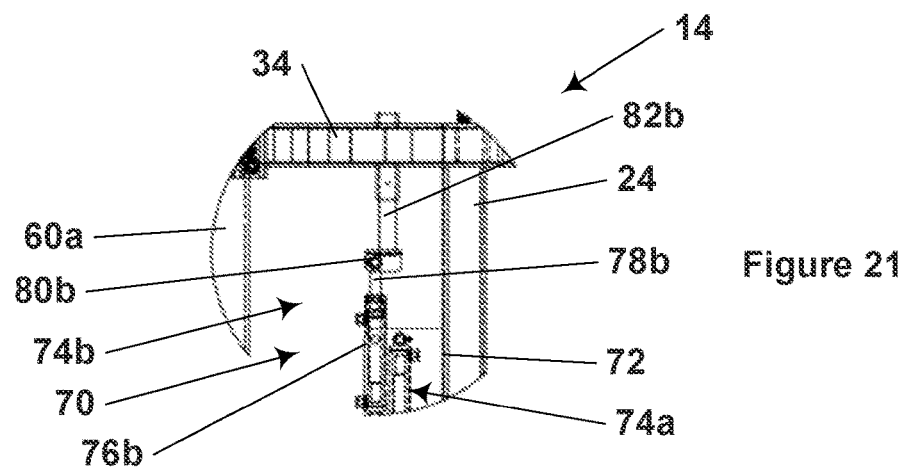
FIG. 21 is an enlarged, bottom view of SEC. 21 of FIG. 20.
Figure 22:
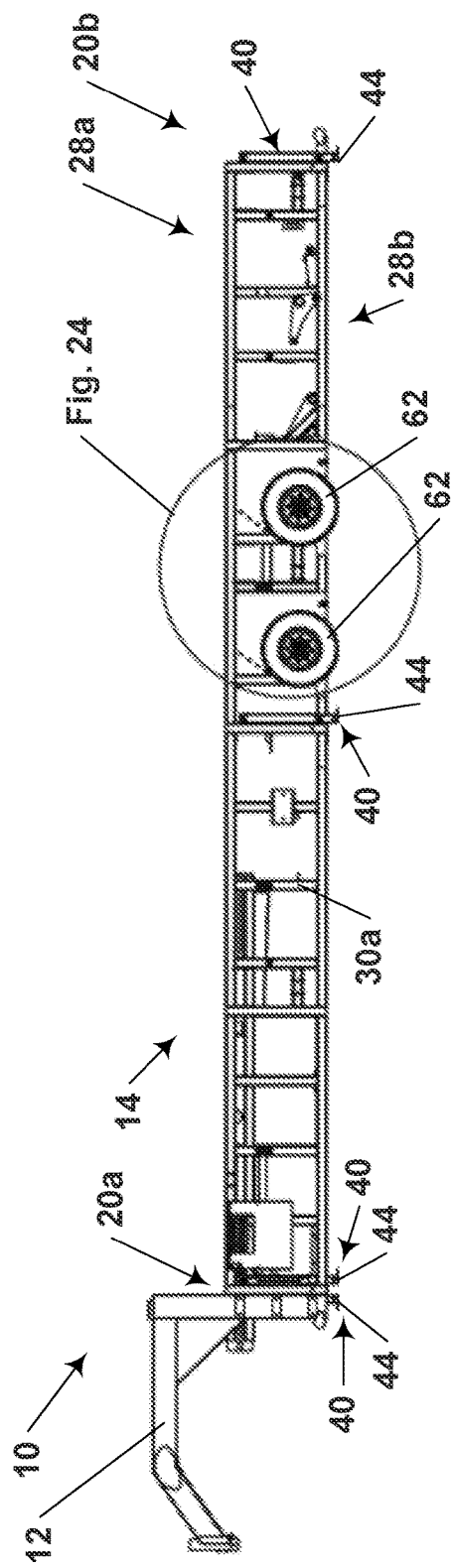
FIG. 22 is a side view of the trailer of FIGS. 1-3 in a third setup stage.
Figure 23:
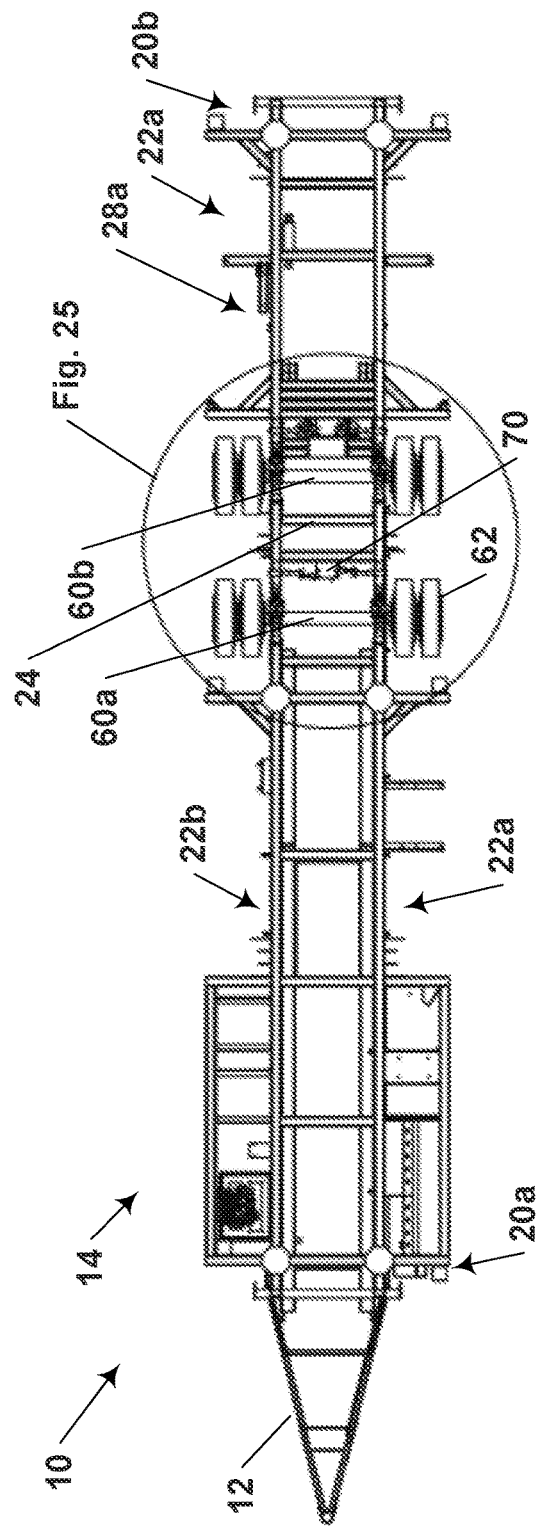
FIG. 23 is a bottom view of the trailer of FIG. 22 in the third setup stage.
Figure 24:
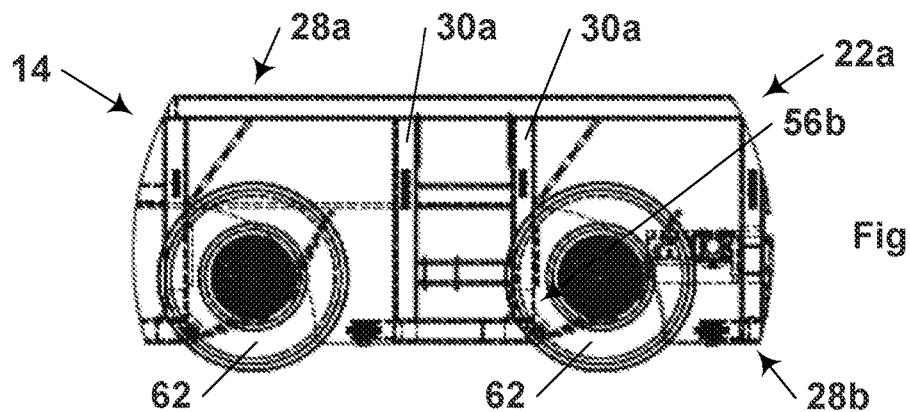
FIG. 24 is an enlarged, side view of SEC. 24 of FIG. 22.
Figure 25:
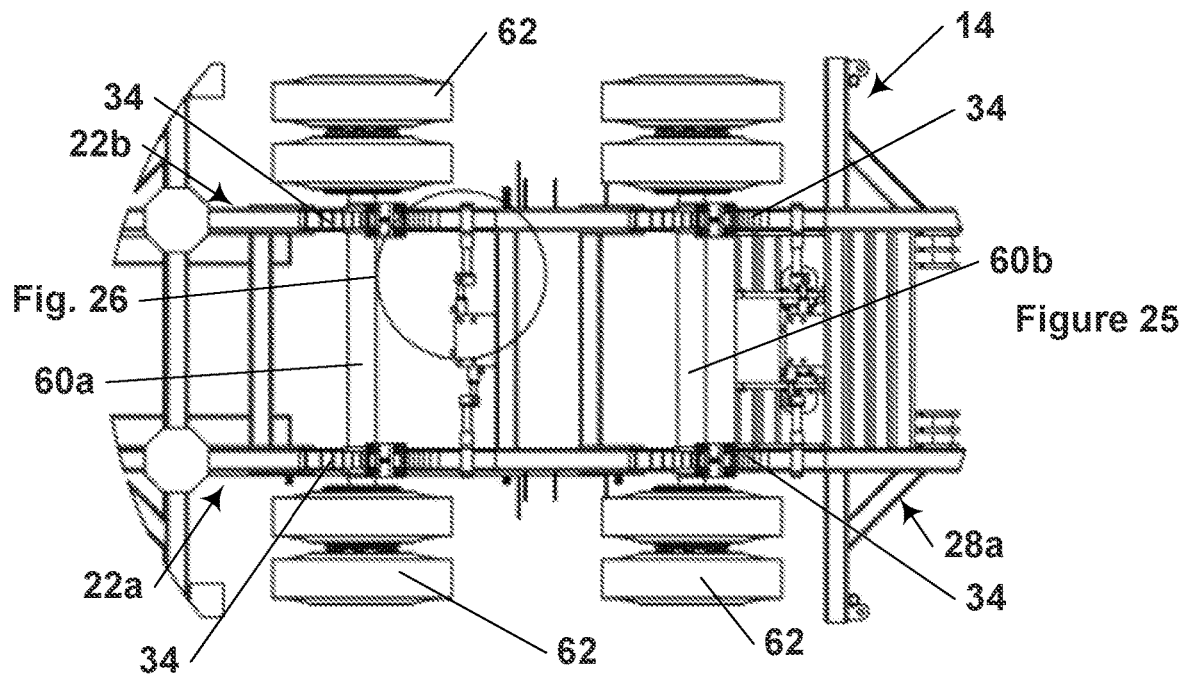
FIG. 25 is an enlarged, bottom view of SEC. 25 of FIG. 23.
Figure 26:
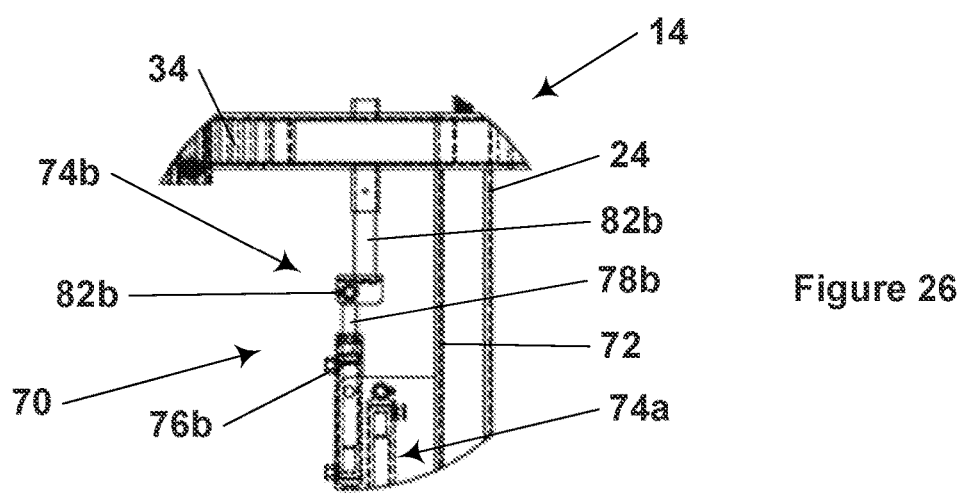
FIG. 26 is an enlarged, bottom view of SEC. 26 of FIG. 25.
Figure 27:
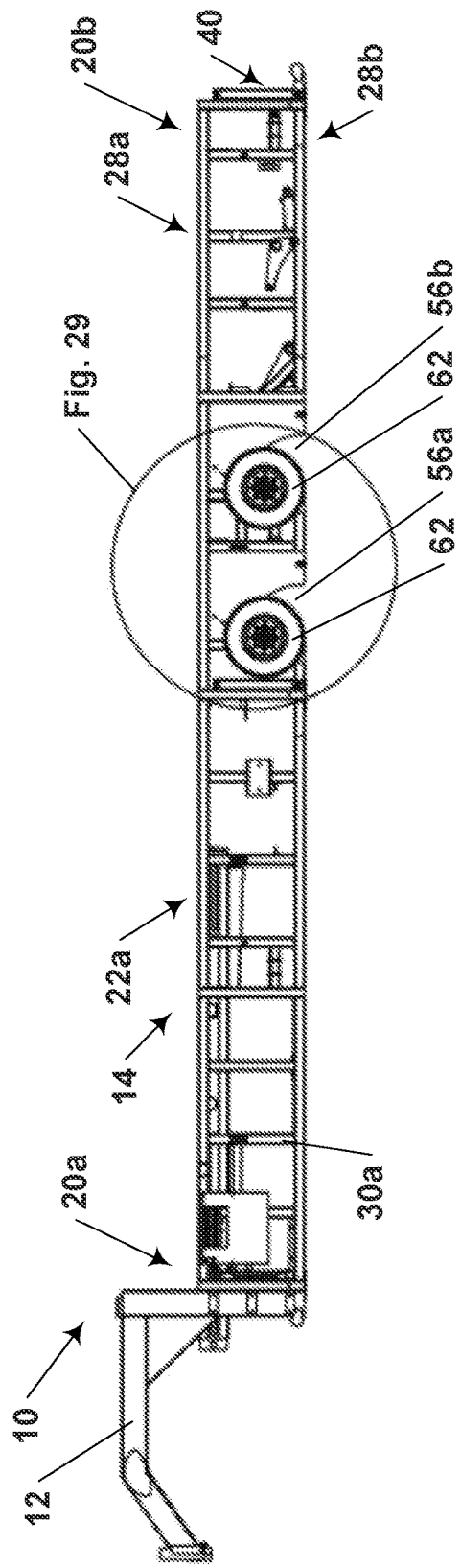
FIG. 27 is a side view of the trailer of FIGS. 1-3 in a fourth setup stage.
Figure 28:
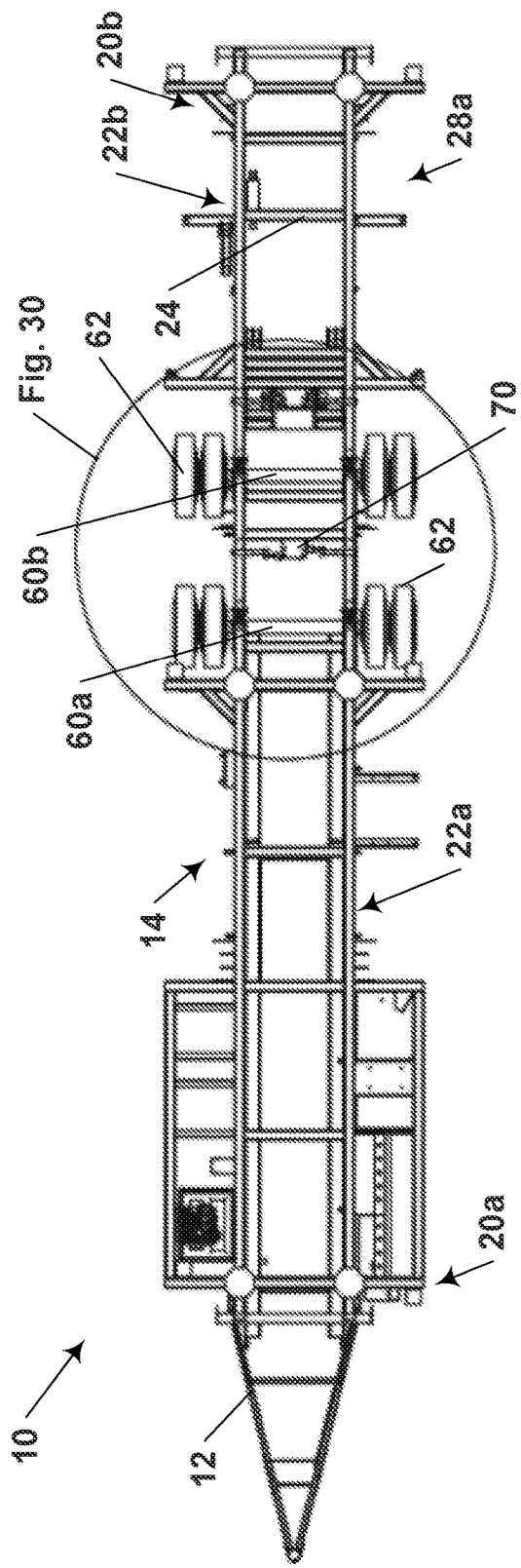
FIG. 28 is a bottom view of the trailer of FIGS. 1-3 in the fourth setup stage.
Figure 29:
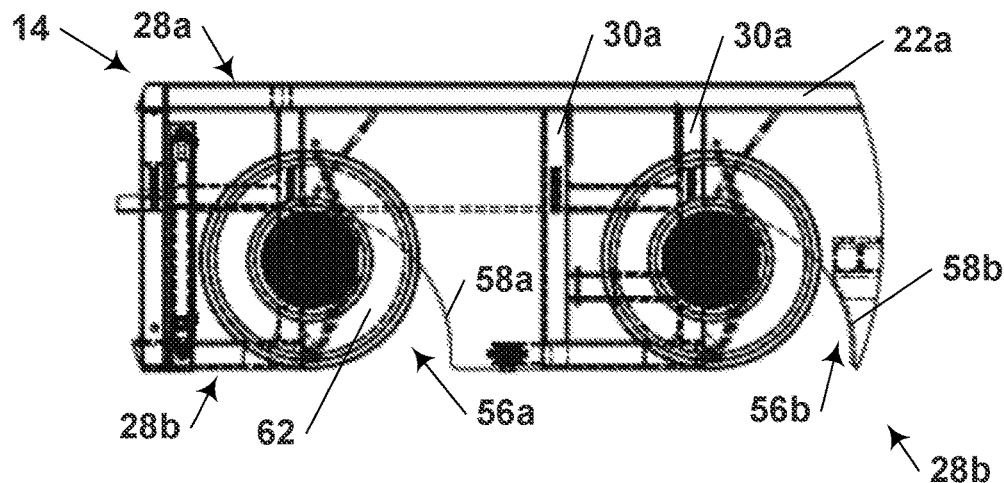
FIG. 29 is an enlarged, side view of SEC. 29 of FIG. 27.
Figure 30:
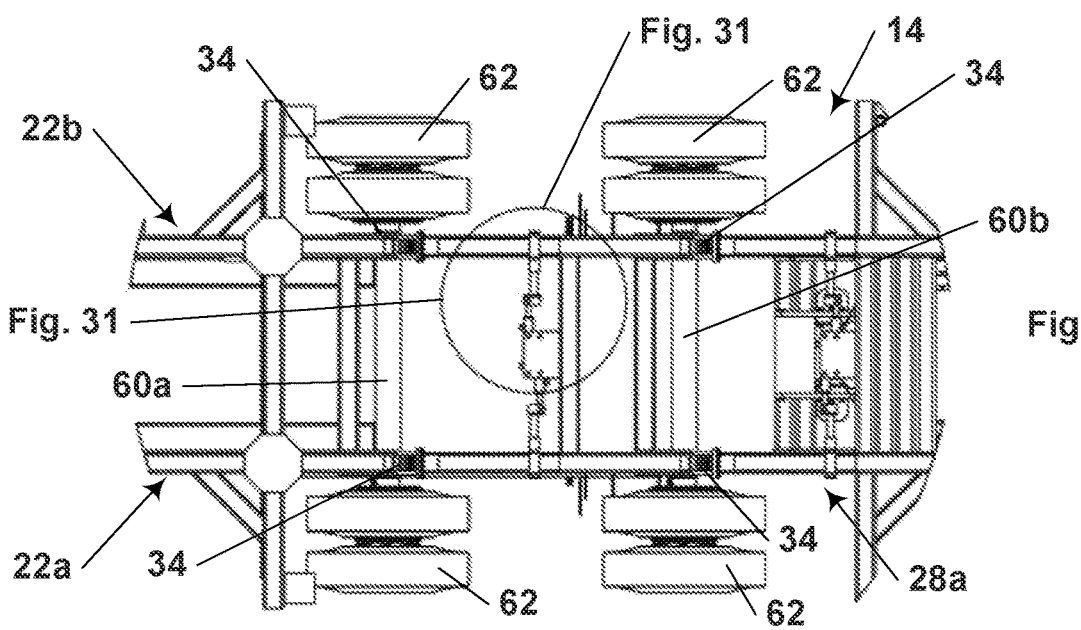
FIG. 30 is an enlarged, bottom view of SEC. 30 of FIG. 28.
Figure 31:
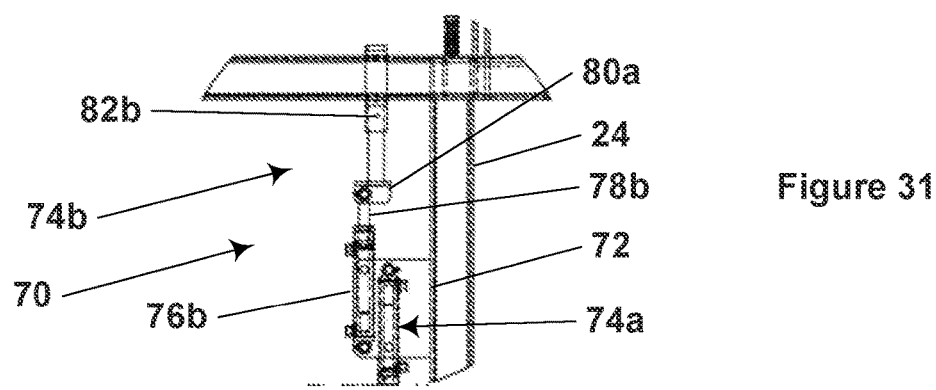
FIG. 31 is an enlarged, bottom view of SEC. 31 of FIG. 30.

Positioned between the first and second axles 60a, 60b, connected to one bottom support 24, is an axle pin group 70. In general terms, each axle pin group 70 is configured to allow for the frame 14 to move with respect to both the axle(s) 60a, 60b and a surface S on which the trailer 10 is positioned. It is noted that the second axle 60b can include an identically configured axle pin group 70, however, a second axle pin group is not shown for ease of illustration. It is envisioned that each axle 60a, 60b, etc. present in the trailer 10 will include an axle pin group 70. The axle pin group 70 includes a support bracket 72 connected to the bottom support 24 as well as a first axle pin assembly 74*a* and a second axle pin assembly 74*b*. The first axle pin assembly 74*a* includes a hydraulic cylinder 76*a* connected to the bracket 72 and a rod 78*a* extending therefrom. The rod 78*a* is connected to a link 80*a* that is connected to an axle pin 82*a* such that the axle pin 82*a* is offset with respect to the rod 78*a*. The second axle pin assembly 74*b* is identically configured and is connected to the support bracket 72, positioned opposite the first axle pin assembly 74*a*. Therefore, the second axle pain assembly 74*b* includes a hydraulic cylinder 76*b* connected to the bracket 72 and a rod 78*b* extending therefrom. The rod 78*b* is connected to a link 80*b* that is connected to an axle pin 82*b* such that the axle pin 82*b* is offset with respect to the rod 78*b*. Due to the links 80*a*, 80*b* offsetting the axle pins 82*a*, 82*b*, the axle pins 82*a*, 82*b* can be linearly aligned, along a similar axis. In this configuration, the axle pin group 70 is configured so that the axle pins 82*a*, 82*b* can be positioned in an extended position (FIGS. 10-11) and a retracted position (FIGS. 20-21). In the extended position, the axle pins 82*a*, 82*b* extend over one end 36*b* of each leaf spring 34 in the extended position so that the axle 60*a* is in a lowered, transport arrangement in which the frame 14 is raised and maintained in position with respect to the axle 60*a* and the surface S. When the axle pins 82*a*, 82*b* are retracted, the axles 60*a*, 60*b* are free to rotate about 36*a* with respect to the frame 14. Fewer or additional axle pin groups can be provided and operatively configured to provide for retraction of any additional axles (e.g., axle 60*b*) in a similar manner.

FIGS. 1-3 and 6-11 illustrate the trailer 10 in an intermediate arrangement in which the trailer 10 can be connected to a vehicle via hitch 12 and driven to the site. In a transport arrangement, the trailer 10 differs only from the intermediate arrangement in that the stabilizers 40 are in a retracted position (and thus, would not be visible) and the axle pins 82*a*, 82*b* are in an extended arrangement to restrict movement of the frame 14 with respect to the axle 60*a* as support blocks 84 connected to respective sides 22*a*, 22*b* to the frame 14 are blocked from upward movement by the respective axle pins 82*a*, 82*b* (only one support block 84 is shown, however, all others can be identically configured). The support blocks 84 prevent the axle 60*a*, 60*b* from bouncing down and out of the recess 56*a*, 56*b*. During transport, it is important that the leaf spring 34 does not come out if the frame 14 starts bouncing. That scenario is very unlikely with the amount of weight that will be pushing down and keeping the leaf spring 34 up. However, the configuration is more important when transitioning from transport arrangement to the lowered arrangement. As the stabilizers 40 extend in the first setup stage, the axles 60*a*, 60*b* have a tendency to rotate downwards. Support block 84 keeps the axles 60*a*, 60*b* constrained in the frame 14 recess 56*a* so that the wheels 62 raise off of the ground or surface S.

In the transport arrangement, the stabilizers 40 are all retracted and the wheels 62 extend downwardly from the frame 14 and are in contact with the surface S. In addition, in the transport arrangement, the frame 14 is elevated and does not contact the surface S. In this configuration, the trailer 10 can be driven to a job site.

Figure 15:
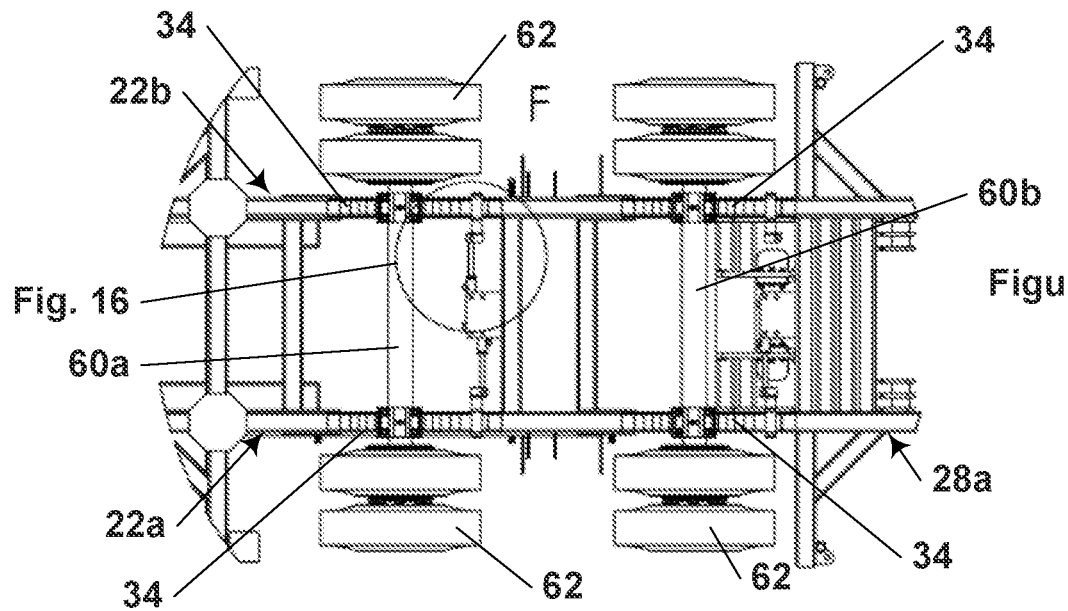
FIG. 15 is an enlarged, bottom view of SEC. 15 of FIG. 13.
Figure 16:
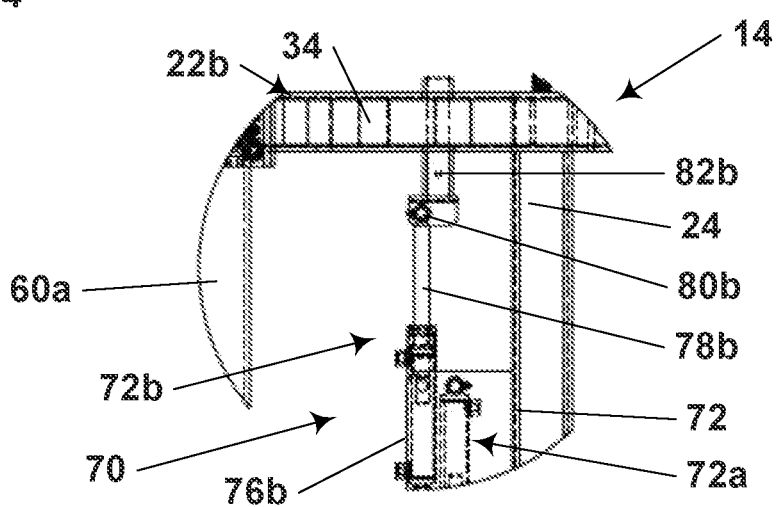
FIG. 16 is an enlarged, bottom view of SEC. 16 of FIG. 15.
Figure 17:
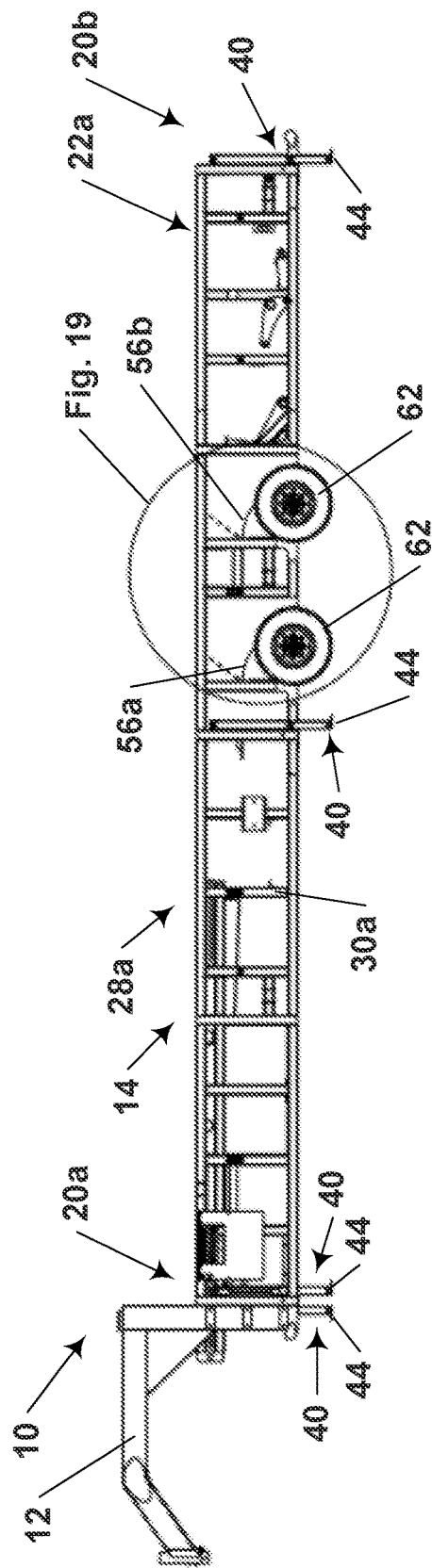
FIG. 17 is a side view of the trailer of FIGS. 1-3 in a second setup stage.
Figure 18:
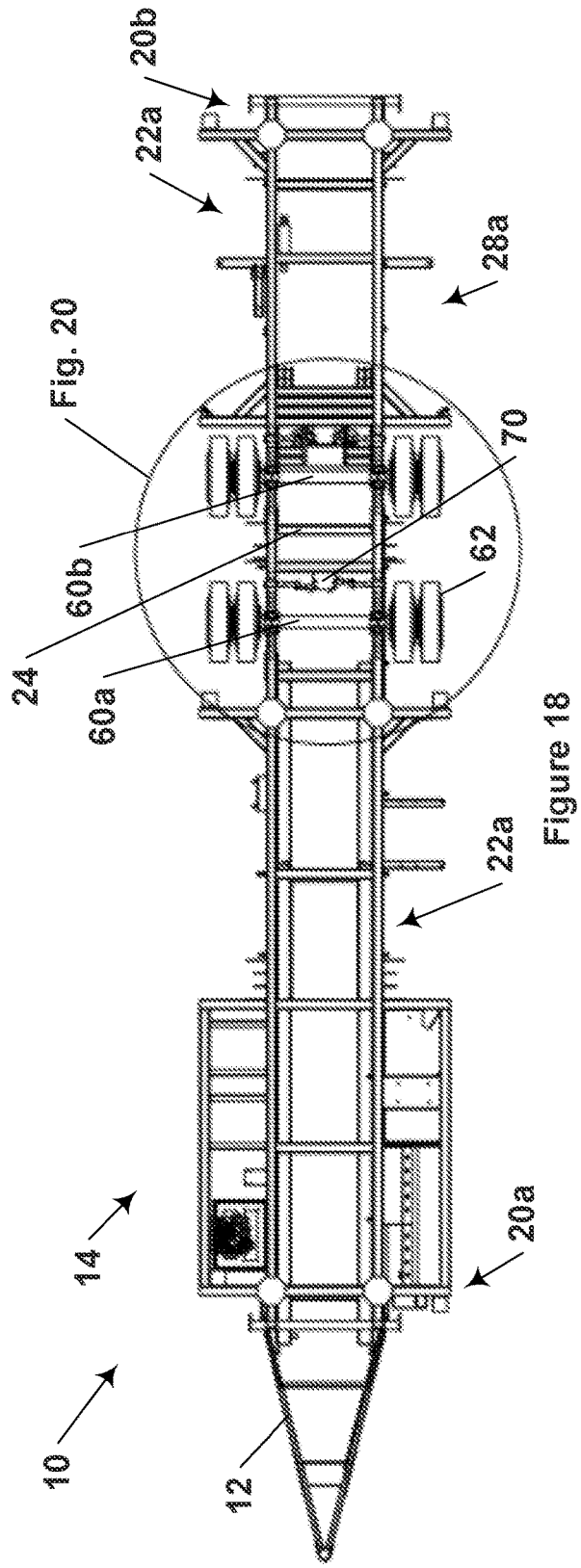
FIG. 18 is a bottom view of the trailer of FIG. 17 in the second setup stage.
Figure 19:
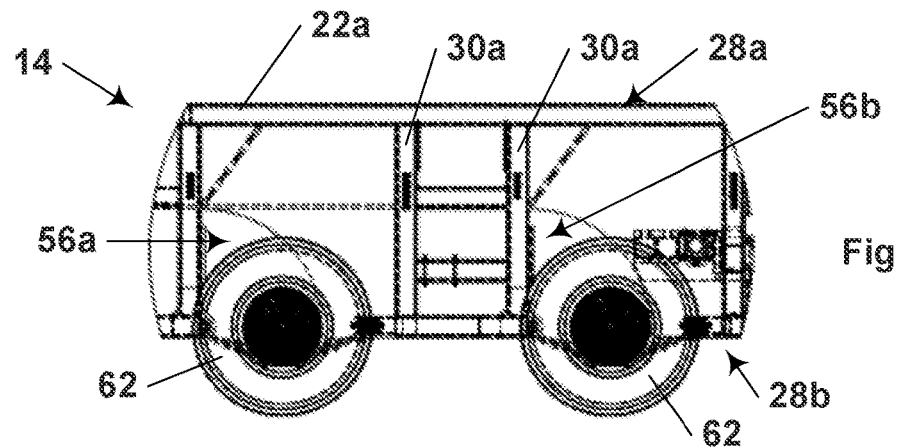
FIG. 19 is an enlarged side view of SEC. 19 of FIG. 17.

FIGS. 12-16 illustrate the trailer 10, once positioned at the site after being transported, wherein the trailer 10 is in a first setup stage. In the first setup stage, the stabilizers 40 are in an extended position and extend outwardly or downward from their respective housings 46 and the frame 14 to the surface S. The stabilizers 40 are configured to contact the surface S and support the weight of the trailer 10 and any item supported thereon. In the first setup stage, the axle pins 82*a*, 82*b* remain in the extended arrangement (FIG. 15-16). In this arrangement, the axles/wheels 60*a*, 60*b*, 62 and frame 14 have not moved or changed location with respect to each other as compared to the previously described transport arrangement.

FIGS. 17-21 illustrate the trailer 10 in a second setup stage. In this stage, the stabilizers 40 are in the extended position, supporting the frame 14 and wheels 62 above the surface S. In this arrangement, the axle pins 82*a*, 82*b* are retracted so that each axle 60*a*, 60*b* rotates counterclockwise about point 36*a*, and the frame 14 lowers vertically with respect to the surface S due to the weight of the frame 14 and any item stored thereon.

FIGS. 22-26 illustrate the trailer 10 in a third setup stage. In this stage, the axle pins 82*a*, 82*b* remain retracted and the stabilizers 40 are partially retracted into their respective housings 46 as to correspondingly lower the frame 14 toward the surface S as the frame 14 pivots about point 36*a*.

FIGS. 27-31 illustrate the trailer 10 in a fourth setup stage. In this stage, the axle pins 82*a*, 82*b* remain retracted and the stabilizers 40 are further retracted into their respective housings 46 so that the frame 14 rests on the surface S. As can be seen in a comparison of FIGS. 9, 14, 19 and 29, the axles/wheels 60*a*, 60*b*, 62 are fully retracted within the recess 56*a*, 56*b*. In this arrangement, the trailer 10 is more stable as compared to when the frame 14 is elevated above the wheels 62.

To transition from the fourth setup stage to the transport arrangement the order of the recited steps above are reversed. Generally, the wheels 42 will already be contacting surface S. The stabilizers 40 raise the frame 14 until the bottom of the leaf spring 34 contacts the top of support block 84 or at least until the top of each leaf spring 34 is underneath axle pin 82*a*. stabilizer. Then, the axle pin group 70 is actuated to extend the axle pins 82*a*, 82*b* to the position of FIGS. 10-11. Finally, the posts 42 of each stabilizer 40 retract into their respective housings 46 to raise stabilizer pads 44.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A trailer comprising:
a frame having opposing first and second sides,
an axle supporting a plurality of wheels,
a first biasing member connected to the frame and the axle rotatably mounted to the first biasing member; and
a second biasing member connected to the frame and the axle rotatably mounted to the second biasing member,
an axle pin group including:
  a bracket secured to the frame,
  a first axle pin, and
  a second axle pin; the first and second axle pins configured and arranged to selectively restrict vertical movement of the frame; wherein movement of the first axle pin and the second axle pin collectively allow for vertical movement of the frame with respect to the axle; and
a plurality of stabilizers secured to the frame, wherein each stabilizer has an extended arrangement and a restricted arrangement; further wherein each stabilizer is configured, in its extended arrangement, to support the frame during movement of the axle.

2. The trailer of claim 1, wherein the first biasing member is a leaf spring.

3. The trailer of claim 1, wherein the first and second axle pins are linearly aligned.

4. The trailer of claim 1, wherein the first axle pin is interconnected to a first hydraulic cylinder configured to control movement of the first axle pin.

5. The trailer of claim 4, further comprising a rod extending from the first hydraulic cylinder, the rod being interconnected to the first axle pin with a link.

6. The trailer of claim 5, wherein the first axle pin is offset with respect to the rod.

7. The trailer of claim 1, further comprising a second hydraulic cylinder interconnected to the second axle pin, the second hydraulic cylinder configured to control movement of the second axle pin.

8. The trailer of claim 1, further comprising a support block supporting the first biasing member against the first axle pin.

9. The trailer of claim 1, wherein movement of the first axle pin and the second axle pin collectively allow for vertical movement the axle with respect to the frame.

10. The trailer of claim 1, further comprising a support block on the first side of the frame, the support block capable of coming into contact with the first axle pin.

11. A method of operating a trailer comprising:
providing a trailer in a transport arrangement, the trailer including:
a frame having first side and second sides,
an axle supporting a plurality of wheels,
a first biasing member connected to the frame and the axle rotatably mounted to the axle, and
a second biasing member connected to the frame and the axle rotatably mounted to the axle,
an axle pin group having a first axle pin and a second axle pin, wherein, in the transport arrangement, the frame is elevated above the plurality of wheels and the first and second axle pins restrict vertical movement of the frame with respect to the axle, wherein the axle pin group further includes a bracket secured to the frame; and
retracting the first and second axle pins so that so that the axle moves horizontally and vertically with respect to the frame;
wherein the first biasing member is pivotally connected to the first side of the frame, the first axle pin restricting movement of the first biasing member in the transport arrangement; and
the trailer has a plurality of stabilizers secured to the frame, the plurality of stabilizers each having an extended arrangement and a retracted arrangement, in which each stabilizer is in a retracted arrangement in the transport arrangement.

12. The method of claim 11, wherein the axle pin group includes a first hydraulic cylinder and a second hydraulic cylinder connected to the bracket.

13. The method of claim 12, wherein the first hydraulic cylinder controls movement of the first axle pin.

14. The method of claim 12, wherein the second hydraulic cylinder controls movement of the second axle pin.

15. The method of claim 11, wherein the first and second biasing members are both leaf springs.

16. The method of claim 11, further comprising at least partially extending the plurality of stabilizers from the frame prior to the step of retracting the first and second axle pins.

17. The method of claim 16, further comprising retracting the plurality of stabilizers after the step of retracting the first and second axle pins.

18. The method of claim 11, wherein the trailer is positioned on a surface and after retracting the first and second axle pins and retracting the stabilizers, the frame contacts the surface.

19. The method of claim 11, wherein during the step of retracting the first and second axle pins, the axle remains stationary.

* * * * *